United States Patent [19]

Bigo

[11] Patent Number: 4,640,519
[45] Date of Patent: Feb. 3, 1987

[54] LIGHT PUSH CHAIRS OF THE FOLDABLE TYPE

[76] Inventor: Jean Bigo, c/o 1 ter, avenue du Hem, 59246 Mons en Pevele, France

[21] Appl. No.: 581,224

[22] Filed: Feb. 22, 1984

Related U.S. Application Data

[63] Continuation of Ser. No. 288,389, Jul. 30, 1981, abandoned.

[30] Foreign Application Priority Data

Jul. 31, 1980 [FR] France .................. 80 16984

[51] Int. Cl.$^4$ .............................. B62B 7/06
[52] U.S. Cl. .................... 280/42; 280/650; 280/658; 297/DIG. 4
[58] Field of Search ................ 280/644, 642, 42, 647, 280/649, 650, 657, 658, 47.41; 297/42, 294, DIG. 4

[56] References Cited

U.S. PATENT DOCUMENTS

| | | | |
|---|---|---|---|
| 654,971 | 7/1900 | Greyer | 280/42 |
| 919,956 | 4/1909 | Robotham | 297/42 |
| 3,390,893 | 7/1968 | MacLaren | 280/644 |
| 3,627,342 | 12/1971 | Morellet | 280/649 |
| 3,945,660 | 3/1976 | Zalewski | 280/42 |
| 4,108,468 | 8/1978 | Orlanski | 280/649 |
| 4,165,097 | 8/1979 | Boudreau | 280/647 |
| 4,353,577 | 10/1982 | Giordani | 280/650 |

FOREIGN PATENT DOCUMENTS

| | | | |
|---|---|---|---|
| 2636602 | 3/1977 | Fed. Rep. of Germany | 280/649 |
| 2644634 | 4/1978 | Fed. Rep. of Germany | 280/649 |

Primary Examiner—David M. Mitchell
Attorney, Agent, or Firm—Curtis, Morris & Safford

[57] ABSTRACT

The invention concerns improvements in light foldable push chairs.

The subject of the invention is a foldable push chair of the baby buggy type comprising two foldable diagonally swept side bars (2) supporting a basket (1), which are provided at their upper end with a handle (4) and are connected at their lower end to the front end of the chassis (6) of the push chair, two rear vertical side bars (8) pivotally connected to the aforesaid two side bars and connected at their lower portion to the rear end of the said chassis (6), an X-joint (9) connecting the lower portion of the rear side bars (8) to the upper portion (2a) of the first two side bars, the said push chair being characterized in that the said chassis (6) has two foldable X-arms (11, 12) which are horizontally positioned, the ends of the arms carrying the axle pins of the four wheels (7) of the push chair and being extended beyond each wheel axle pin by means of an upwardly curved portion (11a, 12a) which is connected by a suspended connecting member (15), of a Daumont type, to the corresponding end of the aforesaid four side bars (2, 8).

Application to baby buggies.

6 Claims, 3 Drawing Figures

LIGHT PUSH CHAIRS OF THE FOLDABLE TYPE

This application is a continuation of application Ser. No. 288,389, filed July 30, 1981, now abandoned.

The present invention concerns light push chairs of the foldable type and more particularly those commonly known as strollers and baby buggies.

This type of push chair comprises, briefly, two inclined side bars terminated at the top by semicircular cane handles similar to those of walking sticks. Mounted on the lower end of these side bars are the axle pins of the front wheels, the axle pins of the rear wheels being mounted on two other side bars connected to the first two.

The basket is fixed on the said side bars and the assembly is made foldable by means of a first horizontal foldable X-joint connecting the four lower ends of the side bars and a second vertical foldable X-joint interposed between the aforesaid two rear side bars.

This type of push chair is in widespread use and it requires no further description either in its structure or in its mode of use.

However, such push chairs have a defect in suspension in that the connection between the said side bar and the wheels is direct, so that the suspension is inflexible to the point of being almost non-existent, the jolts and shocks which occur during travel being damped solely and very incompletely by the elasticity of the pneumatic or solid tyres on the wheels.

Efforts have been made to improve this suspension by providing a shock-absorbing system between the axle pins of the wheels and the supporting side bars, but the problem is not simple, because the shock-absorbing system must not prevent or impede the folding of the push chair.

The only hitherto known shock-absorbing means adapted to this type of push chair consists of helical springs disposed only on the rear wheels, but not on the front wheels.

It will be appreciated that with such a system the improvement in comfort is entirely relatively, especially since the shock-absorbing deflection of the helical springs is very short.

The object of the present invention is to lessen these disadvantages by proposing to adapt to light foldable push chairs of the baby buggy type a suspension system of the Daumont type, which is well known for its comfort and has been in use for a very long time, notably on landaus.

To this end, the invention relates to a light foldable push chair of the baby buggy type, comprising two foldable side bars supporting a basket, which are provided with handles at their upper end and are connected at their lower end to the front end of the chassis of the push chair, two rear side bars pivotally connected to the two aforesaid side bars and connected at their lower portion to the rear end of the said chassis, and an X-joint connecting the lower portion of the rear side bars to the upper portion of the first two side bars, the push chair including the improvement in which the said chassis has two foldable X-arms, which are horizontally positioned, the ends of the arms supporting the axle pins of the four wheels of the push chair and being extended beyond each wheel axle pin by an upwardly curved portion which is connected by a suspended connecting member, of the Daumont type, to the corresponding end of the aforesaid four side bars.

According to the invention, such a push chair therefore makes it possible to combine the advantages of the foldable baby buggy with the comfort of the Daumont suspension, the X-form chassis folding completely in the same way as in conventional baby buggies without the suspension having to be demounted or otherwise touched.

The suspended connection between the ends of the side bars and those of the arms of the X-form chassis can be made in known manner, for example with the aid of a metal shackle, a leather thong or a metal loop connecting the two opposite ends, the resilience of the connection between the side bars and the chassis being obtained concurrently by the spring action of the curved portion of the ends of the arms of the chassis and by the connecting loops between the chassis and the side bars which maintain the latter and the basket in drawn suspension between the ends of the chassis in accordance with the well-known principle of the Daumont suspension.

Further features and advantages will become apparent from the following description of one embodiment of a push chair according to the invention, the description being given only by way of example, with reference to the accompanying drawings in which.

Figure 1:
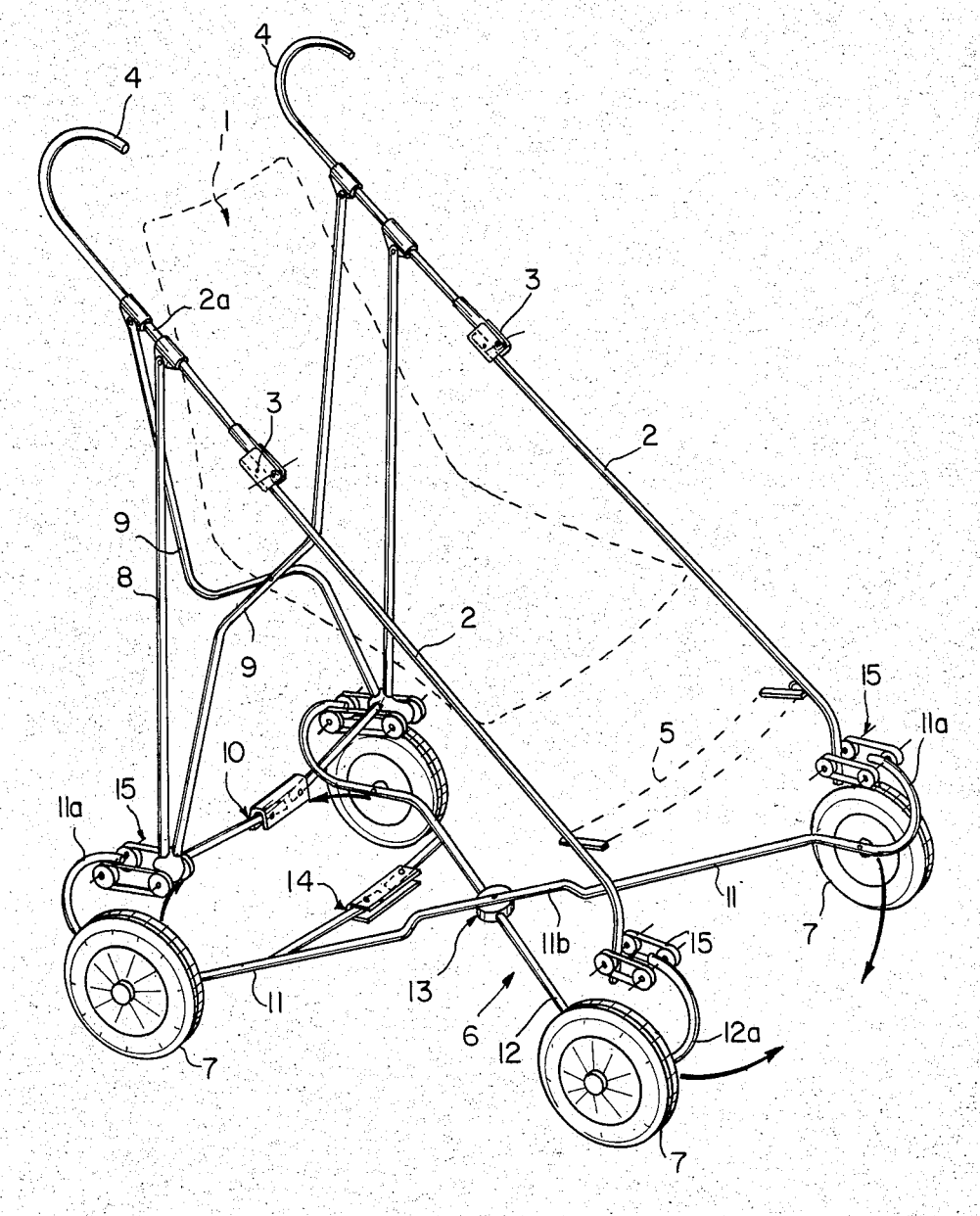
FIG. 1 is a front perspective view of the light push chair of the foldable type, as incorporating the improvement according to this invention.

The baby buggy illustrated in the drawing comprises, briefly, a flexible basket 1 suspended between two parallel inclined side bars 2 foldable at hinges 3, the upper ends of which are in the form of a walking stick handle 4.

Associated with the basket 1 is a foot rest 5 stretched between the two inclined side bars 2.

The lower ends of the latter are connected to the front end of a chassis 6 supporting four wheels 7.

The rear end of the chassis 6 is connected to the lower end of two parallel side bars 8 pivotally connected at their other end to the foldable upper portion 2a of the two side bars 2.

An X-shaped articulated stay 9 is interposed in the manner well known in this type of push chair between the lower ends of the rear side bars 8 and the upper portion 2a of the side bars 2, the said stay 9 being held fast in the open position (that illustrated in the figure) by a strut 10 disposed between the lower ends of the side bars 8.

In accordance with the invention, the chassis 6 also has two horizontal arms 11 and 12 disposed in X form and jointed together substantially at their centre or central articulation point 13. A strut 14 is fitted between the arms 11 and 12 to lock them in the open position for the use of the push chair as illustrated in the figure.

The arms 11 and 12 support at their ends the axle pins of the wheels 7, the arms being extended beyond each wheel by portions 11a and 12a respectively, which are curved upwardly and in the direction of the central portion of the push chair.

The connection between the lower end of the side bars 2 and 8 is made by means of a suspension of the Daumont type.

In the embodiment illustrated in the figure, this connection is made by means of a shackle 15 pivotally connected on the one hand to the curved end 11a or 12a and on the other hand to the side bar 2 or 8.

Figure 2:
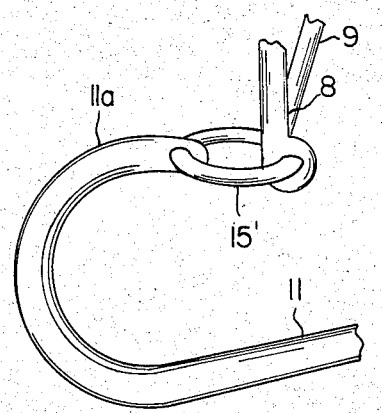
FIG. 2A is a front perspective view of one embodiment of the connecting means for the push chair suspension.
FIG. 2B is another embodiment of the connecting means for the push chair suspension.
Figure 2:
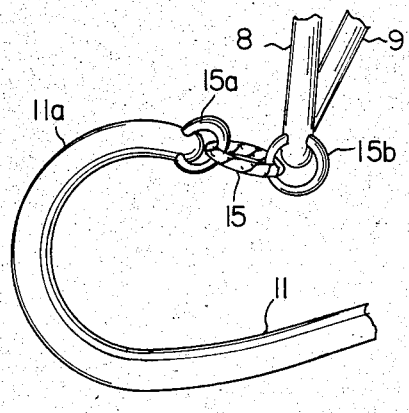

It is to be understood that the said shackle 15 could be replaced by a metal loop 15' in FIG. 2A or could consist of a leather thong 15" as shown in FIG. 2E which passes, for example, into two rings fast respectively with the chassis 6 and with the side bars 2 and 8, as is usually the case in suspensions of this type which are used notably for landaus.

The features and advantages of a drawn suspension of the Daumont type are known and it is therefore unnecessary to describe the behaviour of such a mode of suspension. It will simply be recalled that the comfort of such a suspension emanates from the considerable clearance of the ends of the side bars 2 and 8 from the chassis 6 which is afforded by the freely articulated connecting element (more particularly the shackle 15 or leather or metal loop), and on the other hand from the inherent resilience of the curved portions 11a, 12a.

The chassis 6 folds in accordance with the conventional mode of folding of baby buggies by movement towards one another of the two front wheels and of the rear wheels as indicated by the arrows in the figure, of course after unlocking of the struts 10 and 14.

In the course of this operation, the two walking-stick side bars approach one another with a parallel movement, while the X-shaped stay 9 folds.

The arm 11 of the chassis comprises in its central portion an offset section 11b required for the fitting of the joint at 13, so that those portions of the arms 11 and 12 which are level with the axle pins of the wheels 7 are substantially in a common plane.

Of course, the invention is not limited to the embodiment illustrated and described in the foregoing, but covers all variants thereof, notably in regard to the nature and arrangement of the connecting elements acting by drawn suspension between the chassis 6 and the side bars 2 and 8 of the baby buggy, as well as in regard to the strut 14, which may be optionally employed and/or replaced by any suitable locking device.

I claim:

1. A light-weight foldable push chair of the baby-buggy type comprising two foldable side bars on which a basket is supported, and extending slopingly back from lower ends thereof to upper portions thereof, with push handles provided at their upper portions; two rear side bars each having an upper end pivotally coupled to an associated one of the first-mentioned side bars and a lower end; an articulated stay formed of crossed members having lower ends coupled to the associated lower ends of the rear side bars and upper ends coupled to the upper portions of the first-mentioned side bars; four wheels having axle means for mounting the same; a frame for mounting the axle means of said four wheels, the frame being formed of two foldable arms configured in a horizontal cross and articulated at a center portion for folding together, each said arm having an upwardly curving C-shaped portion at each end of the arm and ending at a free end, with the axle means for an associated wheel being mounted on said frame arms in advance of the associated C-shaped portion; Daumont-type suspended link members non-rigidly joining the free ends of said upwardly curving portions of said foldable frame arms to the respective lower ends of the first-mentioned bars and of the rear side bars so that the suspension means effectively behaves as if the axle means were located between the central articulation point of said foldable arms and the respective intersecting plane of said side arms on said lower extending foldable arms to provide increased support and stability to the chair; an articulated strut pivotally connecting each horizontal cross frame arm thereof to lock the same into an open position and rigidly retaining the horizontal cross frame arms in generally the same horizontal plane to prevent imbalance; and the horizontal cross frame arms, each having an upwardly curving C-shaped portion at each end of the arms, axle means being mounted in advance of the C-shaped portion, the Daumont-type connecting link members non-rigidly joining the free end of the upwardly curving portions to respective lower ends of the first-mentioned bars and of the rear side bars, and the articulated strut all cooperating to retain in a generally parallel alignment the corresponding wheels of the chair to prevent imbalance during use.

2. Push chair according to claim 1, wherein each said suspended connecting link member includes a shackle articulated both at the associated free end of the frame arm and at the lower end of the associated one of the side bars.

3. Push chair according to claim 1, wherein said suspended connecting links each include a loop passing between the associated free end of the foldable arm and the lower end of the associated one of the side bars.

4. Push chair according to any one of the preceding claims, wherein said frame further includes an articulated strut pivotally connecting each arm of the frame to lock the same in an open position.

5. Push chair according to claim 1, wherein said frame arms are each formed as a unitary member including a longitudinal portion and two of said upwardly curving portions.

6. Push chair according to claim 1, wherein said basket includes a seat portion suspended between the first-mentioned side bars and a separate foot rest portion also suspended between the first-mentioned side bars.

* * * * *